United States Patent [19]
Grossi

[11] Patent Number: 5,255,594
[45] Date of Patent: Oct. 26, 1993

[54] AUTOMATIC COFFEE-MAKING MACHINE WITH DIRECT-CURRENT MOTOR DRIVE AND WORM SCREWS

[76] Inventor: Lucio Grossi, Via Sylva 30, Bergamo, Italy

[21] Appl. No.: 907,503

[22] Filed: Jul. 1, 1992

[30] Foreign Application Priority Data

Jul. 3, 1991 [IT] Italy ............ MI91 A 001830

[51] Int. Cl.⁵ .............................................. A47J 31/34
[52] U.S. Cl. .................................... 99/287; 99/289 R; 99/297; 99/302 P
[58] Field of Search ............ 99/289 R, 289 D, 289 P, 99/299, 300, 302 R, 302 P, 284, 280, 283, 285; 426/433

[56] References Cited

U.S. PATENT DOCUMENTS

| | | | |
|---|---|---|---|
| 2,252,614 | 8/1941 | Bowen | 99/289 R |
| 3,277,734 | 10/1966 | Bernard | 74/335 |
| 3,440,951 | 4/1969 | Barrera | 99/289 R |
| 4,796,521 | 1/1989 | Grossi | 99/289 R |
| 4,934,258 | 6/1990 | Versini | 99/289 R |

FOREIGN PATENT DOCUMENTS

| | | | |
|---|---|---|---|
| 0164846 | 12/1985 | European Pat. Off. | |
| 0192797 | 9/1986 | European Pat. Off. | 99/289 R |
| 0270141 | 6/1988 | European Pat. Off. | |
| 0298547 | 1/1989 | European Pat. Off. | |
| 2240639 | 2/1974 | Fed. Rep. of Germany | |
| 3316157 | 11/1984 | Fed. Rep. of Germany | |
| 3615158 | 7/1987 | Fed. Rep. of Germany | |
| 2648033 | 12/1990 | France | 99/289 R |

*Primary Examiner*—Timothy F. Simone
*Assistant Examiner*—Reginald L. Alexander
*Attorney, Agent, or Firm*—Herbert Dubno

[57] ABSTRACT

An automatic coffee-making machine including a drive unit consisting of a direct-current motor having an output shaft provided with a worm screw actuating a sealed rod of a valve body and engaging with a slider movable linearly at a right angle to an axis of rotation of the motor shaft, a shaped member connected with the slider and receiving a free end of a rod of piston, and a device for monitoring and controlling the power input to motor, determining a start and an end of strokes of the piston during the phases of downward movement and compression of the powdered coffee.

9 Claims, 4 Drawing Sheets

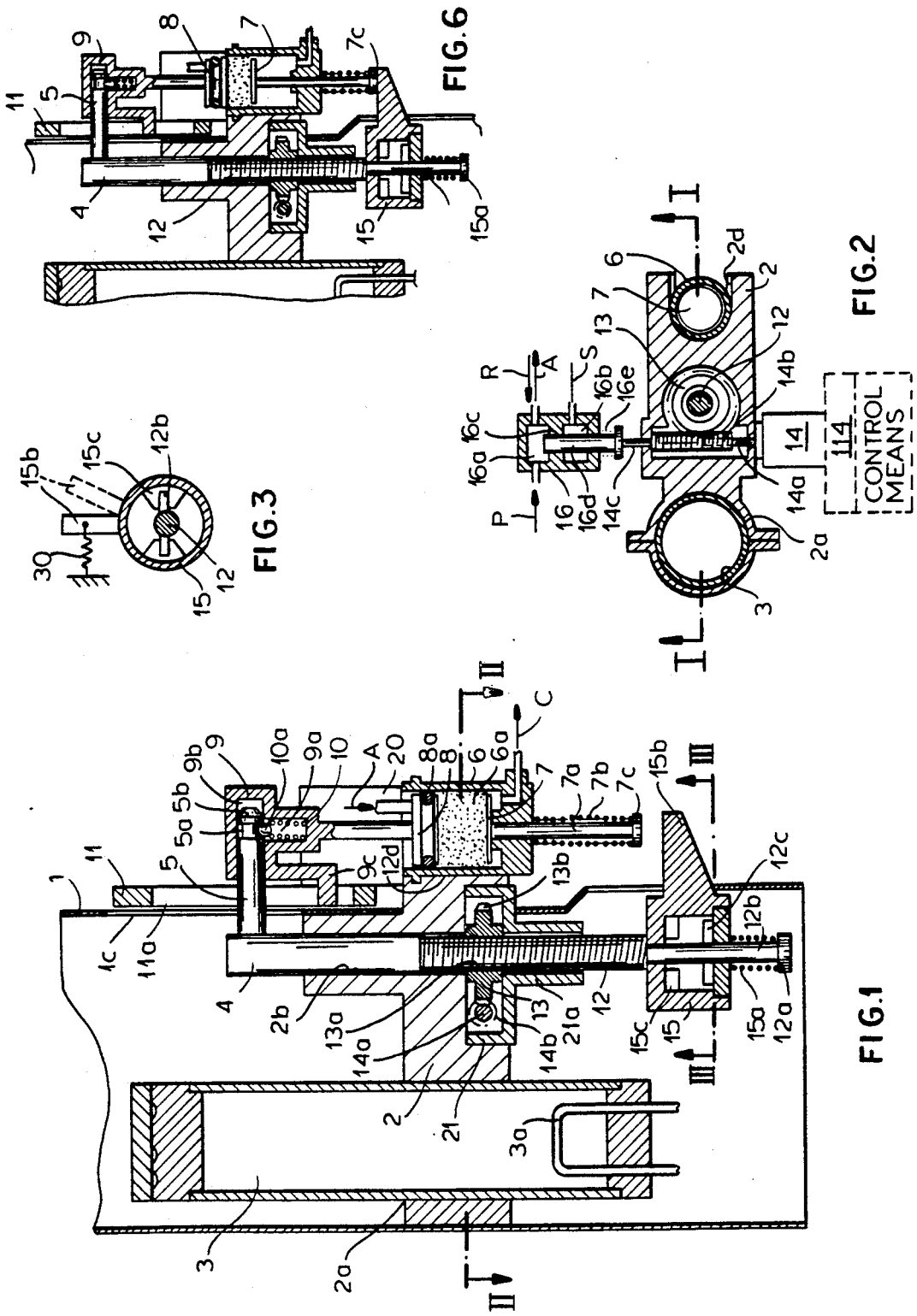

AUTOMATIC COFFEE-MAKING MACHINE WITH DIRECT-CURRENT MOTOR DRIVE AND WORM SCREWS

FIELD OF THE INVENTION

The present invention is related to an automatic machine for making a beverage based on water and coffee extract (hereinafter known simply as "coffee") either of the espresso type or of the so-called American type. Preparing coffee, in particular espresso coffee by means of an infusion obtained with hot water under pressure and powdered coffee, use is made of different kinds of appliances which provide water to be passed through a layer of ground coffee of suitable particle size. The infusion so obtained at high temperature and under sufficient pressure. The infusion so obtained is drawn off. To obtain coffee of a high quality it is desirable that the infusion water be at a temperature lower than boiling point in order to avoid extracting from the coffee not only the aromatic constituents which impart flavour to the beverage, but also undesirable and often harmful constituents which only at temperatures approaching the boiling point of water are released from the powdered coffee. Widespread use is therefore made both in public premises and in private dwellings of appliances which, by supplying water through the powder without raising it to boiling point makes such high-quality coffee.

The automatic coffee-making machines using the powdered coffee are usually provided with a filter-holder equipped with a filter retaining the powdered coffee and allowing the infusion to flow out. The powder is pressed by a piston to a suitable extent and hot water supplied through the piston under pressure brings about infusion. As a result, such a coffee machine needs a drive unit steering the piston into the filter-holder and maintaining it in the inserted position while hot water is supplied under pressure. For this purpose use may be made of drives consisting of motor-reduction units of non-reversible type. But such motor-reduction units are expensive and do not prove to be suitable for a machine intended for use in private dwellings. Analogous problems arise with devices for metering of water, controlling of cycle and so on, in attempting to obtain a compact machine for domestic use which will prove reliable and produce, in an automatic manner, coffee of equivalent quality to that one made with the commercial machines used in public premises and the like, while maintaining relatively small dimensions and reasonable costs.

OBJECTS OF THE INVENTION

It is therefore an object to provide a machine for making "espresso" coffee type or "American" type. Still another object is to provide a coffee machine capable of carrying out in an automatic but controlled manner the entire sequence of operations. Yet another object is to provide a coffee machine which is compact.

SUMMARY OF THE INVENTION

These results are obtained by an automatic coffee-making machine according to the invention and comprising a cylinder, having at the bottom a moving filter for filtering the coffee infusion, into which can be inserted in a sealed manner a piston provided with and means for supplying a hot water under the pressure obtained from a metering unit, a drive unit formed by a direct-current motor with a shaft made integral with a worm screw capable of driving in the axial direction the sealed rod of a valve body and of engaging, with a means of transmission of movement, a slider moving at right angles to the axis of rotation of the motor shaft also made integral with such slider by means of appropriate couplings, a shaped member integral with the free end of the piston rod, a means for ejecting and removing the spent powdered coffee, a means for monitoring and controlling the power input to the motor so as to establish automatically the moments of commencement and end of the piston strokes during the phases of downward movement, insertion into the filter-holder, compression of the powdered coffee, upward movement and lateral rotation for removal. According to this invention the means of transmission of movement of the direct-current motor shaft consists preferably of a gear-wheel of vertical axis on which is provided coaxially an internal screw designed to actuate a threaded shaft. The upper end of the shaft is made integral with a slider and the lower end of which, unthreaded and of smaller diameter than the upper one, is made integral as a circular member equipped with an outward-projecting arm. Particularly, the means for controlling the machine cycle substantially comprises a means for monitoring the overloads of the power input to the motor in relation to the positions of the upper end of stroke determined by stoppage of the pin at the top of the helix of the circular member, and of the lower end of stroke determined by the thickness of the measure of coffee or, in the event of lack of supply, by the striking of the arm against the lower end of the cavity. Furthermore, in the automatic coffee-making machine according to the invention a means for supplying water to the cylinder independently of the valve body is provided, the machine cycle thus is brought about by simple compression by the piston producing the "American" type of coffee.

BRIEF DESCRIPTION OF THE DRAWINGS

The above and other objects, features and advantages of my invention will become more readily apparent from the following description, reference being made to the accompanying highly diagrammatic drawing in which:

FIG. 1 is a partial sectional view of the machine according to the invention, drawn according to line I—I seen in FIG. 2;

FIG. 2 is a sectional view according to lines II—II of FIG. 1;

FIG. 3 is a sectional view according to lines III—III of FIG. 1;

FIG. 6 is a view analogus to the one shown in FIG. 5b during the initial part of the discharge phase.

SPECIFIC DESCRIPTION

Figure 4A:
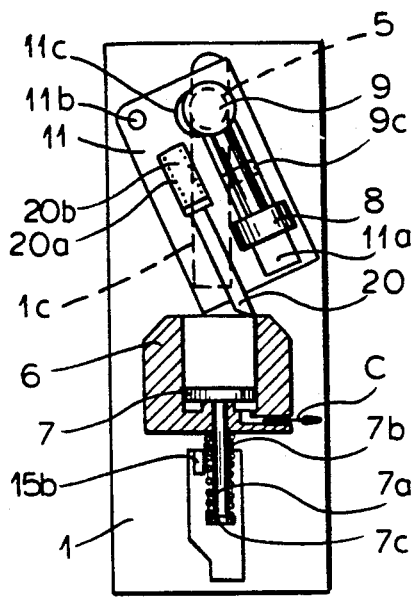
FIGS. 4a,4b,4c are partial sectional schematic views of the machine illustrating the various conditions during the cycle start-up phase.

As shown in FIG. 1, coffee machine 1 according to this invention consists of a supporting member 2 of substantially inverted "T" section on which are provided a circular seat 2a to accommodate reservoir 3 for the water, which is heated by means of element 3a. An open cavity 2b extending vertically throughout the length of the leg of the "T" and capable of guiding a slider 4, to which is made integral an upper arm 5 extending at right angles thereto and provided with an annular outlet 5a near to the free end, which is shaped as a truncated cone 5b. The arm 5 can slide vertically and in a guided manner in a slot 1c provided in a wall 1 of the machine. On the arm of the "T" section opposite that are supporting water reservoir 3 is provided a second seat 2d having a fork shape for the quick attachment and accommodation of cylinder 6 into which is fed the powdered coffee which settles at the bottom on a flat filter capable of being operated in a vertical sense by a rod 7a against the reaction exerted by a spring 7b coaxial with such rod, against an end piece 7c of the rod 7a and against the lower surface of the bottom wall of cylinder 7.

The predetermined quantities of powdered coffee 6a supplied in a known manner are compressed within the cylinder 6 by a piston 8, provided with a means 8a for annular sealing. A piston rod 8b is integral at its upper end with a member 9 provided with a first cavity 9a coaxial with rod 8b of piston 8 and capable of accommodating a spring 10 exerting thrust in a radial sense on a sphere 10a of diameter such as to enable it to be retained by outlet 5a of arm 5 and in order to bring about the rotary coupling of shaped member 9 and therefore of piston assembly 8 with the arm 5 the free end 5a is housed in a further cavity 9b located at right angles to the former. Shaped member 9 also has an appendage 9c projecting transversally towards the vertical leg of the "T" section and capable of being inserted into a cavity 11a of a plate 11, which in turn is hinged to pin 11b (FIG. 4a) around which it can rotate. The cavity 11a has an upper eyelet 11c. To plate 11 is also made integral a blade 20 the upper end of which is pushed downward by a spring 20a housed in a corresponding seat 20b. The blade is provided to slide on the upper free surface of cylinder 8 in order to effect the removal of the powder at the end of the cycle, the variations in length due to rotation of plate 11 being compensated by corresponding variations in the extension of spring 20a. The operation of slider 4 with its arm 5 and piston 8 according to the machine cycle is achieved by means of a threaded shaft 12 having its upper end integral with slider 4, which is actuated by an internal screw 13a of a gearwheel 13 the outer teeth 13b of which are meshed with a worm screw 14b located at right angles to the axis of rotation of shaft 12 and moved by a shaft 14a coaxial therewith of a direct-current motor 14 shown in FIG. 2. Provided are appropriate electronic or like means for controlling the power input and for programming the phases of the machine cycle, which are known and are therefore only illustrated diagrammatically by outline 114. The gear 13 is located in a seat 21 integral with support 2 and forming a vertical shell 21a performing a dual role as a guide for shaft 12 and as a mechanical limit switch for a circular member 15 mounted on the lower end 12b of shaft 12. The lower end of shaft 12 is not threaded and has a smaller diameter than that one of the threaded part, so that circular member 15 may be made to strike the end part of such threaded portion by the thrust exerted by a spring 15a located coaxially with shaft 12 and respectively striking the lower surface of circular member 15 and a disc 12a integral with shaft 12 of the other. Circular member 15 is provided externally with a projecting arm 15b capable of coming into contact, during a corresponding phase of the machine cycle, with the lower end of rod 7a in relation to which it is normally kept in line by the return action of a spring 30 shown diagrammatically in FIG. 3. The circular member 15 is provided a spiral 15c coaxial with shaft 12 provided with a pin 12c made transversally integral therewith.

Figure 4B:
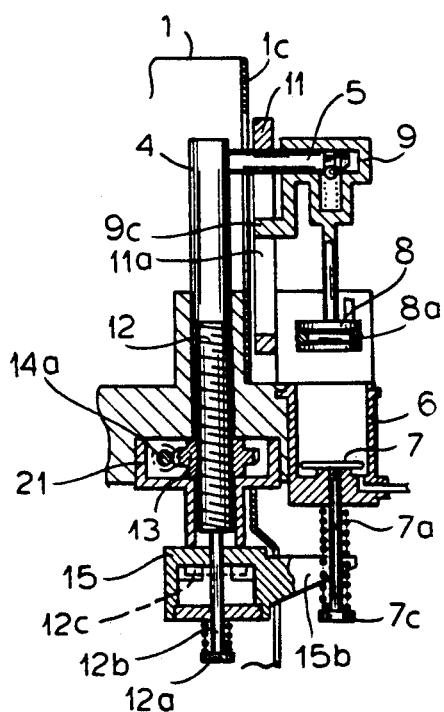
Figure 4C:
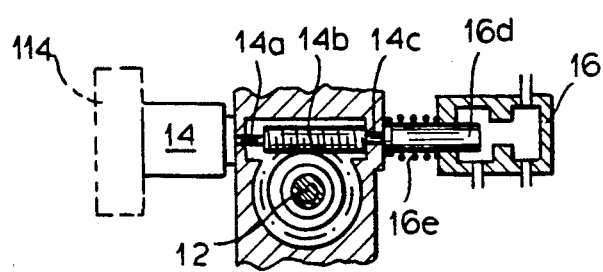
Figure 5A:
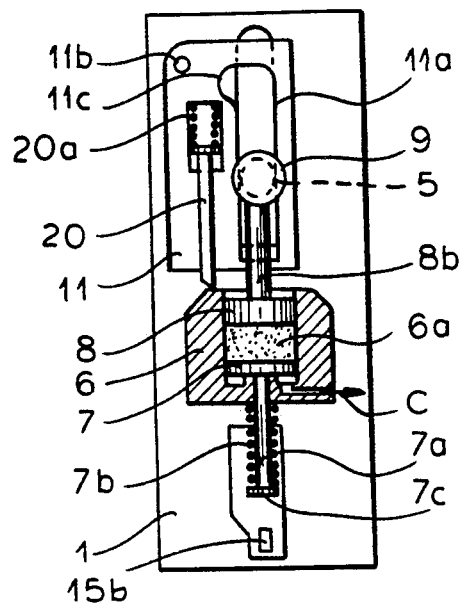
FIGS. 5a, 5b,5c are partial sectional views illustrating the phase of infusion of the coffee.
Figure 5B:
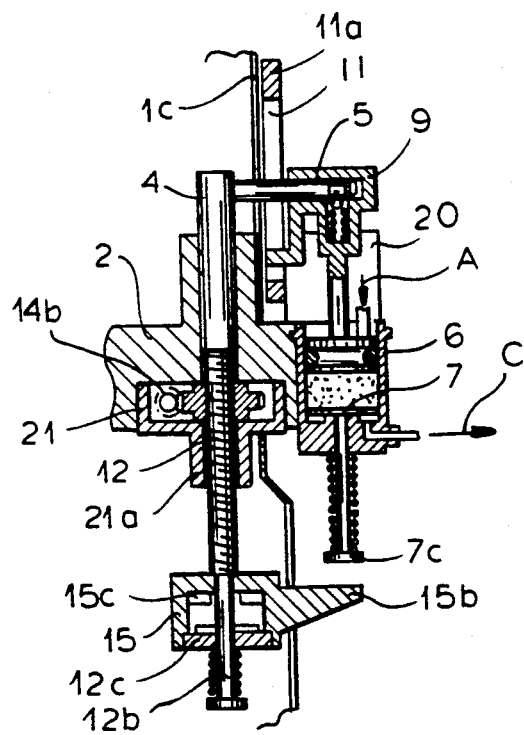
Figure 5C:
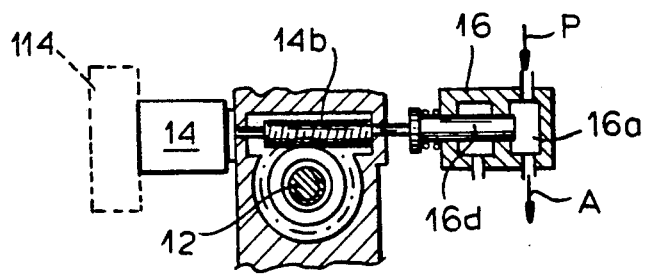
Figure 7A:
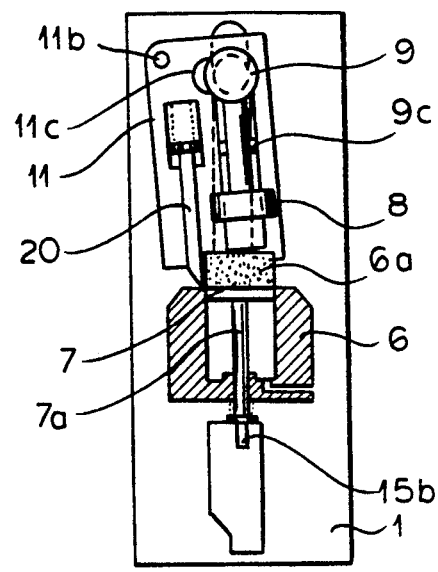
FIGS. 7a,7b,7c are sectional views illustrating the final discharge phase and commencement of disposal of the spent powder.
Figure 7B:
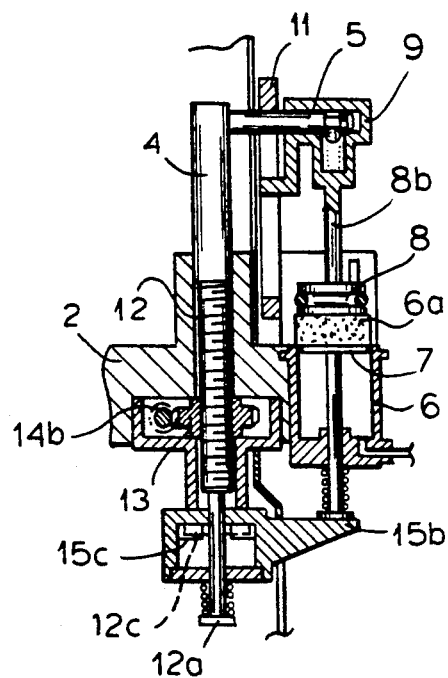
Figure 7C:
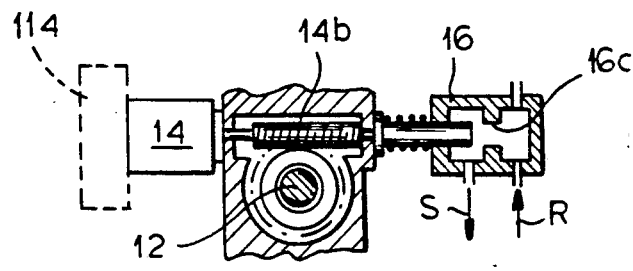

The machine operating mechanism is completed by a valve body 16 (FIG. 2) having two chambers, the first 16a of which is provided with two openings of which one is for the sampling of water according to arrow P and the other is for supplying cylinder 6 according to arrow A, the second chamber 16b is provided with an opening to an discharge the liquid according to an arrow S; the chambers are placed in communication with one another by a duct 16c which can be opened and closed by means of a sealed rod 16d operated transversally by a pin 14c integral with shaft 14a of motor 14 and acting against the force exerted by a spring 16e. The operation of the machine is as follows: at the commencement of the cycle (FIGS. 4a,4b,4c) slider 4 is at the top position and therefore piston 8 is raised, plate 11 is rolled outward, filter 7 is at the bottom of cylinder 6 and circular member 15 is striking against shell 21a with pin 12c inserted, at the end of the stroke, in spiral 12c, so that arm 15b is rolled into a position out of line in relation to rod 7a of filter 7 the sealed rod 16d of valve 16 is drawn outward providing the passage between chambers 16a and 16b. When the cycle is started by coin operation or pushbutton control the predetermined measure of coffee 6a is supplied to cylinder 6 (FIGS. 5a-5c), powered by motor 14 which begins to drive its shaft 14a, gearwheel 13 being operated in a direction such as to cause the rotation of shaft 12 so as to bring about the downward movement of slider 4 (FIG. 5b), and therefore of piston 8 and circular member 15, with the corresponding downward movement of pin 12c which, on disengaging spiral 15c, allows spring 30 to return arm 15b which ends up in a lower position relative to rod 7a. At the same time motor shaft 14a pushes sealed rod 16d to the bottom of its stroke, thus sealing off passage 16c and placing duct P (FIG. 5c), which samples the liquid in boiler 3, in contact with duct A supplying the liquid to cylinder 6 in which it flows under pressure through coffee measure 6a to produce the infusion, which is delivered via outlet duct C. Following delivery, a new command to motor 14 brings about the reversal of rotation of the latter so as initially to return rod 16d of valve 16 and open communication duct 16c, which allows return R of the residual pressure remaining in the cylinder for rapid discharge via port S. Thereupon the rotation of the shaft 12 is reversed (FIG. 6) and the shaft 12 starts to rise carrying with it circular member 15, arm 15b of which lifts up rod 7a of filter 7 which, on rising, conveys to the free rim of cylinder 6 the spend measure of coffee. During such movement (FIGS. 7a,7b,6c) member 15 strikes shell 21a against which it stops, while shaft 12 continues to rise until arm 5 of slider 4 reaches the upper end of cavity 11a against the shaped top of which it begins to exert pressure, forcing plate 11 to rotate around pin 11b carrying with it blade 20 which, under the thrust exerted by spring 20a, is maintained in contact with the edge of cylinder 6, thus bringing about the removal of the spend measure of coffee. Simultaneously with shaft 12 there also rises pin 12c which, together with spiral 15c, engages the latter, raising it up to the top end of stroke and causing the rotation of arm 15b with the consequent disengagement of the latter from the lower end of rod 7 which, under the return movement of spring 7b, recovers its initial setting and conveys filter 7 to the bottom of the cylinder. The parts of the machine thus resumes its initial positions (FIGS. 4a,4b,4c) and the machine is ready for a new cycle. In particular, it is possible with such configuration to achieve a so-called "American" coffee infusion, which is done by simple compression without overpressure; in this case there is supplied a predetermined measure of coffee; smaller than the normal quantity used for espresso coffee, the remaining space in cylinder 6 being filled with water; at this point the normal machine cycle commences, but without the supply of further water under pressure, so that the coffee infusion is obtained solely by the pressure exerted by the downward movement of piston 8 in cylinder 6. It should also be noted that with a machine configuration according to this invention has been designer to eliminate all the electromechanical limit switches necessary to establish the beginning and end of the various phases of the machine cycle. Thus, by using means of control connected to the direct-current motor it is possible to establish, by monitoring the overload of power input to the motor, the two moments of end of stroke brought about during downward movement by the resistance exerted by the measure of coffee to the thrust action of the piston. This resistance is proportional to the thickness of the measure, and during upward movement by the resistance obtained by the locking of pin 12c which has raised spiral 15c to the end of the stroke characterized by contact of the circular member 15 with the guide 21. It is also possible, by calibrating such power input to motor 14, to predetermine the pressing of coffee measure 6a, or conversely to bring about any change in the thickness thereof due to malfunction of the supply system.

The control of the machine cycle comprises a means 114 for monitoring the overload of the power input to the motor in relation to positions of the upper end of stroke, determined by the stoppage of pin 12c at the top of helix 15c and of the lower end of stroke, determined by the thickness of coffee measure 6a or, in the event of lack of supply, by the striking of arm 9c against the lower end of the cavity 11a. By using a simple means it is possible to turn off the motor upon ending of the upper and down strokes.

I claim:

1. A coffee machine, comprising:
   a support;
   a direct current motor on said support provided with a motor shaft rotatable about a shaft axis;
   a worm screw coaxial with said shaft and formed thereon;
   means for supplying a hot water on said support;
   a slider mounted displaceably between extreme positions on said support and extending along a slider axis perpendicular to said shaft axis and provided with a free end;
   transmitting means for transmitting a rotational movement of said shaft to a linear movement of said slider displaceable between opposite extreme positions, said transmitting means including:
   a slider shaft connected to said slider and formed with a threaded part operatively connected with said worm screw and an unthreaded stem formed with a stem free end,
   a worm wheel meshing with said worm screw and threadedly engaging said threaded part for driving said slider shaft in a direction perpendicular to said worm shaft on rotation of said worm wheel,
   a pin mounted fixed on said stem and extending radially therefrom;
   a shaped member operatively connected with said free end of said slider;
   coupling means on said free end of said slider for connecting said slider with said shaped member;
   a piston on said shaped member;
   a cylinder on said support, positioned to receive said piston, receiving a powdered coffee and formed with a bottom, said piston being sealably movable into said cylinder toward said bottom for producing a coffee infusion in an inward position of said piston upon displacing of said slider to one of said extreme positions said piston being connected with said means for supplying hot water;
   displaceable filter means in said cylinder for filtering the coffee infusion upon moving said piston inwardly into said cylinder, said filter means including a filter in said cylinder and a bar mounted fixed on said filter and alignable with said piston and extending axially oppositely thereto;
   discharging means for ejecting spent powdered coffee from said cylinder upon producing the coffee infusion, said discharging means including:
   an annular member mounted slidably on said stem of said slider shaft and housing said pin,
   first spring means between said stem free end and said annular member for urging said annular member against said threaded part of the shaft,
   an arm on said member extending radially outwardly therefrom,
   a second spring means for yieldably holding said arm in alignment with said bar of said filter means, said bar and said arm being spaced apart in said inward position of said piston,
   a spiral coaxial with said stem and formed in said annular member and engageable by said pin, said arm engaging said bar upon displacing said slider from said one extreme position, so that said filter with a cake of spent coffee move axially from said bottom of said cylinder; and
   removing means for removing said cake of spent coffee from the cylinder, said pin engaging said spiral upon removing said cake and swinging said arm out of alignment with said bar, so that said filter means are displaced back toward said bottom of said cylinder.

2. The coffee machine defined in claim 1 wherein said means for supplying hot water is a valve which includes a valve body formed with:
   a first port receiving the hot water;
   a second port for delivering the hot water to said piston and cylinder;
   a third port for discharging a residual pressure in said cylinder upon displacing said piston in said outward position;
   a first chamber, said first and second ports opening into said first chamber; and
   a second chamber coaxial with said rod, said first and second chamber forming a passage therebetween sealed by said rod upon moving said piston to said inward position.

3. The coffee machine defined in claim 1 wherein said threaded part of said shaft has a diameter larger than a diameter of said stem.

4. The coffee machine defined in claim 1, further comprising control means for preventing overloading of said motor in said inward position of said piston.

5. The coffee machine defined in claim 1 wherein said support is formed with a seat coaxial with said shaft and provided with an axial extension guiding said shaft and having a respective bottom, said annular member being pressed against said bottom of said seat upon removing said cake.

6. The coffee machine defined in claim 1 wherein said coupling means includes a projection extending radially from said free end and supporting said shaped member, said shaped member being formed with a first cavity receiving said projection and with a second cavity centered on said piston axis, said second cavity housing a spherical member and a spring braced against said spherical member pressing against said projection in order to lock the latter in said shaped member.

7. The coffee machine defined in claim 1 wherein said support is provided with a plate connected with said shaped member and said piston, said plate being mounted to pivot on said support about a pivot axis extending perpendicular to said slider axis, said removing means including a blade fixed on said plate to pivot therewith and removing said cake from said cylinder in an extreme position of said slider opposite said one extreme position.

8. The coffee machine defined in claim 7 wherein said blade is spring loaded on said plate, so that said blade is in continuous contact with said cylinder upon pivoting of said plate.

9. The coffee machine defined in claim 1 wherein said support is formed with a fork, said cylinder being mounted in said fork.

* * * * *